Figures 1, 2:
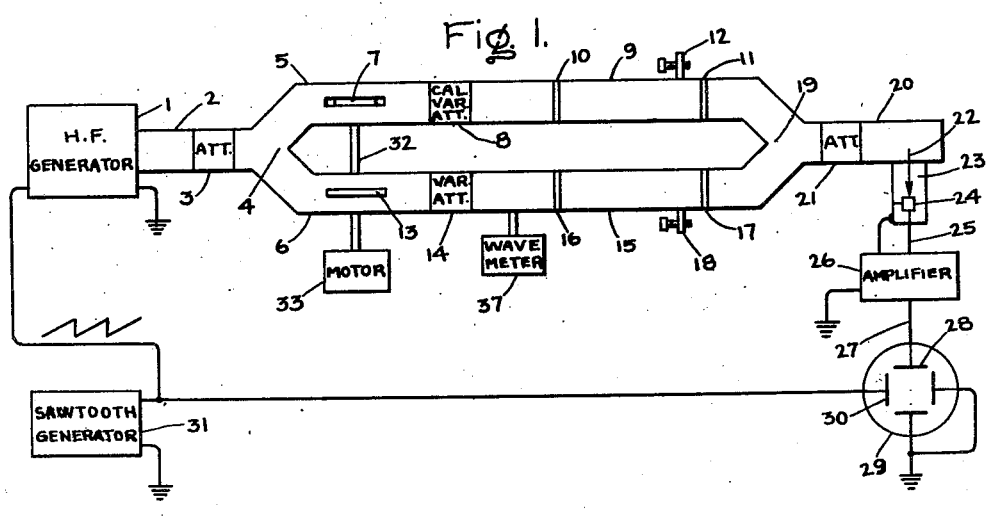

Dec. 5, 1950

J. M. LAFFERTY ET AL
APPARATUS FOR ANALYZING FLUIDS
BY MICROWAVE ABSORPTION
Filed Dec. 30, 1949

2,532,817

Inventors:
James M. Lafferty,
Amandus H. Sharbaugh,
by Paul A. Frank
Their Attorney.

Patented Dec. 5, 1950

2,532,817

UNITED STATES PATENT OFFICE 2,532,817

APPARATUS FOR ANALYZING FLUIDS BY MICROWAVE ABSORPTION

James M. Lafferty, Schenectady, and Amandus H. Sharbaugh, Scotia, N. Y., assignors to General Electric Company, a corporation of New York Application December 30, 1949, Serial No. 135,878

5 Claims. (Cl. 175—183)

1

Our invention relates to spectroscopic apparatus and, in particular, to apparatus utilizing ultra high frequency waves to study the molecular structure and the transmission characteristics of fluids.

Spectroscopic methods have long been utilized to study the structure of matter with useful results. In optical spectroscopy, measurements of the wavelength and the intensity of the spectral components which are emitted or absorbed, as the case may be, yield data that can be correlated with the structure of the atom. In the study of molecules, spectroscopic methods are employed to obtain the molecular absorption spectrum as characteristic of molecular, rather than atomic, structure. It has been found that microwaves, that is very short electromagnetic waves, having wavelengths of the order of a few centimeters are particularly useful to study the structure of molecules and, particularly, the electrical transmission characteristics of fluids or gases.

Spectroscopy employing microwaves involves the study of vibrational and rotational transitions of polar molecules in the gaseous state. The atoms in the molecule may vibrate in several ways and the molecule itself may rotate with certain allowed values of angular momentum. When a molecule undergoes transition from a given energy state to a lower one, it emits radiation of a specific frequency. Conversely, when subjected to an electromagnetic field of this frequency, the molecule absorbs energy from the field. Measurement of the frequency and the intensity of the lines of the absorption spectra provides useful information concerning the characteristics of the molecules which comprise the fluid.

It is an object of our present invention to provide new and improved apparatus employing microwaves to determine the characteristics of fluids.

It is another object of our invention to provide new and improved spectroscopic apparatus employing microwaves which avoids the introduction of errors into the study because of the characteristics of the apparatus employed.

In its broad aspect, our invention consists in providing a source of high frequency waves which is transmitted over a pair of parallel conductive paths, one containing a fluid of known characteristics and the other path including a fluid whose characteristic is to be determined, the energy from the source being rapidly switched for alternate transmission over the two paths to

2 a single detecting source. A calibrated energy attenuating means in the path of the standard fluid permits the accurate comparison of the characteristics of the fluid being studied with those of the standard fluid.

The features of our invention which we believe to be novel are set forth with particularity in the appended claims. The invention itself, however, both as to its organization and method of operation, together with further objects and advantages thereof, may best be understood by reference to the following description taken in connection with the accompanying drawing, in which Fig. 1 is a schematic diagram in plan view of apparatus embodying our invention, and Fig. 2 is an enlarged perspective view of a portion of the apparatus of Fig. 1.

In Fig. 1, ultra high frequency or microwave energy is generated in a generator 1 and supplied to a wave transmission source illustrated as a wave guide 2 of the hollow metallic pipe type. Alternatively, the wave transmission system may comprise a transmission line of the concentric conductor type. Energy from the source 1 is transmitted through wave guide 2 and a "padding" attenuator device 3 to a division point 4. At the point 4, the wave guide 2 is connected through a Y connection to two branch transmission paths. The branch transmission paths likewise are illustrated as wave guides 5, 6 of the hollow metallic pipe type.

The branch wave guide 5 includes a switching device 7, a variable calibrating attenuator 8 and a closed section 9. The section 9 is formed by means of spaced transverse windows 10, 11 which may be formed, for example, from glass or sheet mica. The section 9 preferably comprises an evacuated region or a region which may be filled with a fluid of known characteristics. A valve 12 permits evacuation of the region 9 or filling the region with such a fluid.

The wave guide 6 comprises a switching device 13, a variable attenuator 14 and a closed section 15 for containing a fluid whose characteristics are to be determined. Section 15 may be formed similar to the section 9, windows 16 and 17 forming end walls for the section and valve 18 providing an arrangement for the introduction of a fluid to be studied.

At their ends remote from junction point 4, guides 5, 6 merge at point 19 for connection to a continuing wave guide section 20. Wave guide 20 includes a padding attenuator 21 and, near its end, is coupled by means of a probe 22 to a section of concentric transmission line 23. The position of probe 22 and point of connection of transmission line 23 relative to the end of continuing section 20 are adjusted so that no power is reflected back over branch guides 5 and 6. Any small reflections which do occur are absorbed by the padding attenuators 21 and 3.

An extension of probe 22 forms the inner conductor of transmission line 23 and is connected to a detecting device 24. The device 24 may comprise, for example, a crystal rectifier, a bolometer, a thermistor, or any other suitable device for detecting microwave energy. Currents detected by device 24 are supplied over a conductor 25 to a conventional amplifier 26. The output voltage of amplifier 26 is supplied over a conductor 27 to one of the vertical deflecting plates 28 of a cathode ray tube 29. One of the horizontal plates 30 of cathode ray tube 29 is supplied with a saw-tooth wave of voltage from a saw-tooth generator 31. The remaining vertical and horizontal plates of cathode ray tube 29 are connected together and to ground. Sawtooth generator 31 likewise supplies a saw-tooth wave of voltage to a control electrode of high frequency generator 1 to vary the frequency of the generated microwaves over a desired band of frequencies.

Switching devices 7 and 13 are connected together by means of a shaft 32 for rotation by means of a motor 33. The devices 7, 13 may comprise any means for rapidly switching microwave energy from source 1 for transmission alternately through guides 5 and 6. One form of such device is illustrated in Fig. 2 which shows the devices 7, 13 as comprising disks or wheels mounted on shaft 32, each of the disks having attached to its outer edge an energy absorbing strip which extends around half the periphery of the disk. Energy absorbing strip 34 attached to the periphery of disk 13 is displaced through an angle of 180° relative to strip 35 attached to disk 7.

The wave guides 5 and 6 are each provided with longitudinal slots 36 in their top and bottom walls, in Fig. 2 only the slots in the top wall being shown. These slots permit entry of the energy absorbing strip into the wave guide, the slots being spaced so that strips 34, 35 enter the guides at points of maximum electric field intensity.

In operation of our improved spectroscopic apparatus, the section 9 of wave guide 5 is either evacuated or filled with a fluid of known characteristics. Section 15 of wave guide 6 is filled with a fluid whose characteristics are to be studied. Such a fluid may comprise a gas at a pressure of the order of several hundred microns. When the high frequency generator 1 is modulated in frequency by means of voltages derived from sawtooth generator 31 and shaft 32 is rotated by means of synchronous motor 33, which is synchronized so that its rotation is one half that of the saw-tooth frequency, two amplitude-frequency plots corresponding to energy coming down the branch guides 5, 6 are obtained upon the fluorescent screen of cathode ray tube 29. Preferably, the saw-tooth generator 31 operates at a frequency sufficiently high to permit a sustained presentation on the cathode ray tube of both of the patterns obtained over both wave guides 5 and 6. The variable calibrating attenuator 8 is adjusted until equal peaks are obtained for the two curves on the screen of the cathode ray tube. The amount of attenuation due to the presence of the fluid in section 15 is then obtained by reading directly from a scale (not shown) attached to calibrating attenuator 8.

The saw-tooth generator 31 applies a frequency switching voltage to a control electrode of high frequency generator 1 to vary the frequency of the waves supplied by generator 1 to the wave guide sections 5 and 6. Simultaneously, a saw-tooth wave from the generator 31 is used to sweep the beam of the cathode ray tube rapidly over a horizontal range as the frequency of the generator 1 is varied over its range of frequencies. As a result, there is obtained upon the screen of cathode ray tube 29 a curve of frequency vs. amplitude, the curve having a maximum amplitude at the natural frequency of the high frequency generator.

In order to measure directly the absorption frequencies of the material being studied and contained in section 15, a wavemeter 37 is connected to one of the branch guide sections and is shown in Fig. 1 as connected to wave guide section 6. Preferably, wavemeter 37 is of the absorption type including a cavity resonator to absorb energy from the waves being supplied over wave guide 6. In operation of this portion of the apparatus, when an absorption line is noted upon the output curve corresponding to energy transmitted through wave guide 6, the resonance frequency of wavemeter 37 is adjusted by controlling the dimensions of the cavity resonator in a conventional manner until a sharp decrease or "pip" is obtained in the amplitude of the curve at the point of the absorption line. The frequency corresponding to the absorption line may then be read directly from a scale (not shown) attached to wavemeter 37.

An important advantage of our improved spectroscopic apparatus is that it eliminates all extraneous attenuating effects, such as those caused by the wave guide system itself. Thus, prior to introduction of a fluid to be studied into region 15, the region 15 may be evacuated and variable attenuator 14 adjusted so that identical output curves are obtained from both wave guide sections 5 and 6.

One of the disadvantages commonly encountered in studies of gases by means of high frequency waves is the unavoidable irregularities in voltage and amplitude in a high frequency generator. In our improved apparatus, the effect of such irregularities is eliminated from the studies, since the comparison between the evacuated region 9 and the fluid filled region 15 is made almost simultaneously. As a result, any frequency or amplitude variations in the output of generator 1 affect the output curves of both sections of wave guide to the same degree.

At the same time, since a single detector 24 is employed, differences in the response characteristics of such detectors, such as is encountered in systems employing two or more detectors, are avoided. Obviously, it is apparent also that calibration for the detectors, which would be required if a plurality of detectors are employed, is avoided.

While the rapid switching of microwave energy from high frequency generator 1 to detector 24 through wave guides 5 and 6 alternately may be effected by other types of switches or attenuators, such as for example gaseous discharge devices placed in the wave guide sections 5 and 6 with switching arrangements to alternately initiate and terminate the discharge of the device, the rotating attenuator switching arrangements illustrated are substantially frequency insensitive so that the frequency of generator 1 may be varied over a wide range without requiring retuning of the switching device.

While we have shown a particular embodiment of our invention, it will of course be understood that we do not wish to be limited thereto since various modifications may be made, and we contemplate by the appended claims to cover any such modifications as fall within the true spirit and scope of our invention.

What we claim as new and desire to secure by Letters Patent of the United States is:

1. Apparatus for determining characteristics of a fluid comprising a source of ultra high radio frequency waves, an ultra high radio frequency detector, a pair of parallel conductive paths connected between said source and said detector, one of said paths including an arrangement for containing a fluid of known characteristics, the other of said paths including an arrangement for containing a fluid whose characteristics are to be determined, and means for rapidly switching the flow of ultra high radio frequency waves from said source to said detector over said paths alternately.

2. Apparatus for determining the absorption characteristics of a gas comprising a source of high frequency waves, a detector, a pair of metallic wave guides connected in parallel between said source and said detector, one of said wave guides including an arrangement for containing a first gas of known characteristics, the other of said wave guides including an arrangement for containing a second gas whose characteristics are to be determined, a cathode ray tube connected to said detector, and means for rapidly switching the flow of high frequency waves from said source to said detector over said wave guides alternately to produce on the screen of said cathode ray tube simultaneously two curves corresponding to the transmission characteristics of said first and second gases.

3. Apparatus for determining the characteristics of a gas comprising a source of high frequency waves, a detector, a cathode ray tube connected to said detector, a pair of parallel conductive paths connected between said source and said detector, one of said paths including an arrangement for containing a first gas of known characteristics, the other of said paths including an arrangement for containing a gas whose characteristics are to be determined, an arrangement for rapidly alternating the flow of high frequency energy through said paths to obtain on the screen of said cathode ray tube two curves corresponding to the transmission characteristics of said first and second gases, and energy attenuating means connected in one of said paths.

4. Apparatus for determining the absorption characteristics of a gas comprising a source of high frequency waves, a detector, a cathode ray tube connected to said detector, a pair of metallic wave guides of the hollow pipe type connected in parallel between said source and said detector, the first of said guides including a region adapted to be evacuated, the other of said guides including a region containing a fluid whose characteristics are to be determined, means for rapidly switching the flow of energy from said source to said detector through said guides alternately, and means for varying the frequency of said waves over a band of frequencies to obtain on the screen of said cathode ray tube two curves corresponding to the transmission characteristics of said first and second guides.

5. Apparatus for determining the absorption characteristics of a gas comprising a source of high frequency waves, a detector, a cathode ray tube connected to said detector, a pair of wave guides connected in parallel between said source and said detector, one of said guides containing a region adapted to be evacuated, the other of said guides containing a region adapted to be filled with a gas whose characteristics are to be determined, means for varying the frequency of waves of said source over a band of frequencies, means for alternating the path for energy flow between said source and said detector through said two guides successively to obtain on the screen of said cathode ray tube two curves corresponding to the transmission characteristics of said two guides, and frequency measuring means attached to one of said guides.

JAMES M. LAFFERTY.
AMANDUS H. SHARBAUGH.

No references cited.